United States Patent
Choubey et al.

(10) Patent No.: US 8,214,326 B2
(45) Date of Patent: *Jul. 3, 2012

(54) REDUCING DATA STORAGE REQUIREMENTS ON MAIL SERVERS BY STORING A SHARED COPY OF A MESSAGE

(75) Inventors: Utkarash Choubey, Lucknow (IN); Amit K. Jnagal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 407 days.

This patent is subject to a terminal disclaimer.

(21) Appl. No.: 11/930,034

(22) Filed: Oct. 30, 2007

(65) Prior Publication Data

US 2008/0052324 A1   Feb. 28, 2008

Related U.S. Application Data

(63) Continuation of application No. 10/212,627, filed on Aug. 1, 2002, now Pat. No. 7,305,430.

(51) Int. Cl.
*G06F 7/00* (2006.01)

(52) U.S. Cl. .................. 707/609; 709/203; 709/206

(58) Field of Classification Search .............. None
See application file for complete search history.

(56) References Cited

U.S. PATENT DOCUMENTS

| | | | |
|---|---|---|---|
| 5,414,757 A | 5/1995 | Thompson | |
| 5,506,872 A | 4/1996 | Mohler | |
| 5,652,885 A | 7/1997 | Reed | |
| 5,671,463 A | 9/1997 | Morikawa | |
| 5,757,891 A | 5/1998 | Wang | |
| 5,812,780 A | 9/1998 | Chen | |
| 5,881,292 A | 3/1999 | Sigal | |
| 6,009,481 A | 12/1999 | Mayer | |
| 6,035,104 A | 3/2000 | Zahariev | |
| 6,047,272 A | 4/2000 | Biliris | |
| 6,131,123 A | 10/2000 | Hurst | |
| 6,134,599 A | 10/2000 | Chiu | |
| 6,167,402 A | 12/2000 | Yeager | |
| 6,177,939 B1 | 1/2001 | Blish | |
| 6,185,208 B1 | 2/2001 | Liao | |
| 6,192,112 B1 * | 2/2001 | Rapaport et al. | 379/88.22 |
| 6,256,672 B1 | 7/2001 | Redpath | |
| 6,260,049 B1 | 7/2001 | Fitzgerald | |

(Continued)

OTHER PUBLICATIONS

Sharing encountered information: digital libraries get a social life Marshall, C.C.; Bly, S.; Digital Libraries, 2004. Proceedings of the 2004 Joint ACMIIEEE Conference on 2004 pp. 218-227.

(Continued)

*Primary Examiner* — Belinda Xue
(74) *Attorney, Agent, or Firm* — Anthony V S England; William Steinberg (57) ABSTRACT

A mail server detects if an incoming message is addressed to multiple recipients, in which case redundant data storage is reduced. A single shared copy of the message is stored, and a reference message, which refers to the shared message, is provided to the addressed recipients. A record of the number of existing reference messages is maintained, and decremented as each reference message is deleted by recipients. When no reference messages remain, the shared message is also deleted. A record of recipients authorized to access the shared message is also maintained, and updated as recipients delete their reference messages.

18 Claims, 6 Drawing Sheets

U.S. PATENT DOCUMENTS

| | | |
|---|---|---|
| 6,282,270 B1 | 8/2001 | Porter |
| 6,289,012 B1 | 9/2001 | Harrington |
| 6,295,341 B1 | 9/2001 | Muller |
| 6,338,149 B1 | 1/2002 | Ciccone |
| 6,397,261 B1 | 5/2002 | Eldridge |
| 6,430,183 B1 | 8/2002 | Satran |
| 6,457,047 B1 | 9/2002 | Chandra |
| 6,519,225 B1 | 2/2003 | Angle |
| 6,556,666 B1 | 4/2003 | Beyda |
| 6,574,670 B1 | 6/2003 | Eguchi |
| 6,604,156 B1 | 8/2003 | Slivkoff |
| 6,615,241 B1 | 9/2003 | Miller |
| 6,622,161 B1 | 9/2003 | Jensen |
| 6,631,398 B1 | 10/2003 | Klein |
| 6,704,772 B1 * | 3/2004 | Ahmed et al. ............... 709/207 |
| 6,772,397 B1 | 8/2004 | Bates |
| 6,950,879 B2 | 9/2005 | Zhou |
| 7,003,551 B2 | 2/2006 | Malik |
| 7,035,902 B1 | 4/2006 | Bates |
| 7,058,683 B1 | 6/2006 | Belissent |
| 7,069,340 B1 | 6/2006 | Evans |
| 7,117,246 B2 | 10/2006 | Christenson |
| 7,177,980 B2 | 2/2007 | Milillo |
| 2002/0065892 A1 * | 5/2002 | Malik ........................ 709/206 |
| 2002/0112008 A1 | 8/2002 | Christenson |
| 2002/0120748 A1 | 8/2002 | Schiavone |
| 2002/0122543 A1 * | 9/2002 | Rowen ..................... 379/93.01 |
| 2002/0132609 A1 | 9/2002 | Lewis |
| 2002/0138582 A1 | 9/2002 | Chandra |
| 2002/0143951 A1 | 10/2002 | Khan |
| 2002/0150094 A1 | 10/2002 | Cheng |
| 2003/0014477 A1 | 1/2003 | Oppenheimer |
| 2003/0041112 A1 | 2/2003 | Tada |
| 2003/0069892 A1 | 4/2003 | Hind |
| 2003/0105816 A1 | 6/2003 | Goswami |
| 2004/0073616 A1 | 4/2004 | Fellenstein |
| 2004/0109544 A1 | 6/2004 | Didcock |
| 2004/0255048 A1 | 12/2004 | Lev Ran |
| 2004/0260710 A1 | 12/2004 | Marston |
| 2005/0044074 A1 | 2/2005 | Peltonen |
| 2005/0188026 A1 | 8/2005 | Hilbert |
| 2006/0020525 A1 | 1/2006 | Borelli |
| 2007/0055735 A1 | 3/2007 | Raghunandan |

OTHER PUBLICATIONS

MICA: pervasive middleware for learning, sharing and talking Kadous, M.W.; Sammut, C.; Pervasive Computing and Communications Workshops, 2004. Proceedings of the Second IEEE Annual Conference on Mar. 14-17, 2004 pp. 176-180.

Comparative analysis of web-based collaborative systems Bafoutsou, G.; Mentzas, G.; Database and Expert Systems Applications, 2001. Proceedings. 12th International Workshop on Sep. 3-7, 2001 pp. 496-500.

* cited by examiner

REDUCING DATA STORAGE REQUIREMENTS ON MAIL SERVERS BY STORING A SHARED COPY OF A MESSAGE

CROSS REFERENCE TO RELATED APPLICATION

This is a continuation of, and hereby claims the benefit of the priority date of, application Ser. No. 10/212,627 of Aug. 1, 2002.

FIELD OF THE INVENTION

The present invention relates to mail servers, and reducing data storage requirements thereon.

BACKGROUND

Mail servers typically use hard disks to manage the ongoing data storage requirements of the email systems they support. Free hard disk capacity on mail servers is often limited, which creates difficulties for mail server administrators attempting to manage disk space on their mail servers.

Mail server administrators may ask users to reduce the size of their mailboxes to reduce data storage requirements. However, the recipients' requirements may still exceed available data storage capacity. In this case, recipients may be unable to open their mailboxes because of the excess size of their mailboxes. Users' email messages may be consequently deleted or archived.

Some useful techniques have been developed to date for reducing the consumption of disk space on mail servers. U.S. Pat. No. 6,256,672 to International Business Machines Corporation (issued Jul. 3, 2001 and entitled "Method and system for efficiently notifying an information copy recipient in an electronic mail system") discloses a technique for permitting a sender to selectively send attachments only to some recipients of an email message. However, this disclosed technique is not applicable if the sender intends to send the attachment to all recipients of the email message.

In any event, high disk space consumption often requires the purchase of additional data storage capacity to accommodate data storage requirements on mail servers.

In view of the above observations, a need clearly exists for effectively reducing the data storage requirements of mail servers.

SUMMARY

Email messages that are sent to multiple recipients on the same mail server can be a major contributor to increased consumption of data storage capacity on mail servers.

Consider the simple example of an email message sent to all employees of an organization. The email message attaches a document that is 1.0 MB in size. The rest of the mail message (for example, the text, header and footer etc) is 0.1 MB in size. The email message has a total size of 1.1 MB. If the organization has 100 employees, the email message is stored in the mailbox of each of these employees. Consequently, a further 110 MB of disk space is consumed on the organization's mail server.

The techniques described herein enable only one copy of the above-described email message to be stored on the mail server. Redundant data storage is thereby reduced. Each of the addressed recipients of the email message access the same copy of the email message on the mail server, consequently reducing data storage requirements associated with the email message.

Incoming email messages addressed to multiple recipients are stored for use, and a reference message that links to the shared message is distributed to each recipient. The reference message is transparent to the recipient, as the reference message links directly to the shared message. The recipient views only the shared message. For each such incoming email message addressed to multiple recipients, an authorization table is maintained of recipients authorized to access the shared message.

The techniques described herein desirably reduce disk space consumption only in the case of email messages that are addressed to more than one recipient.

DETAILED DESCRIPTION

Figure 1:
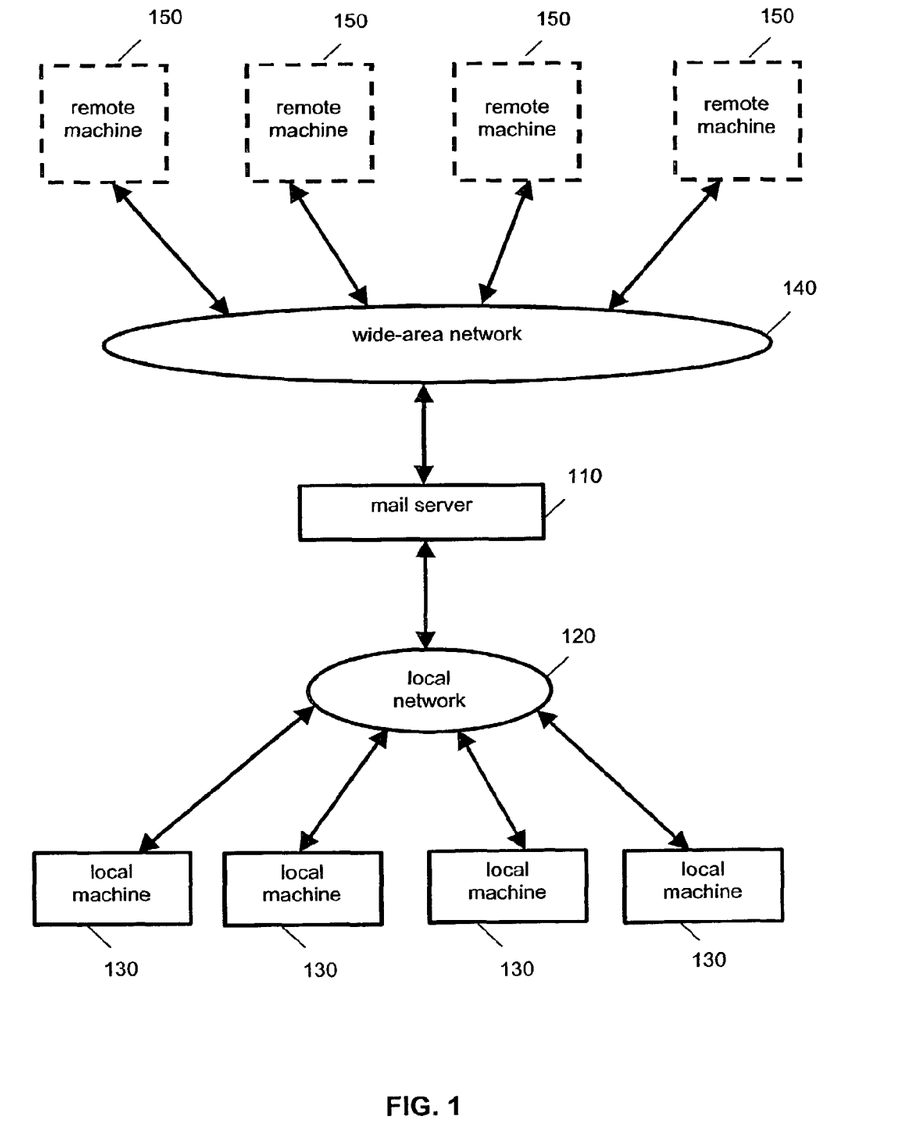
FIG. 1 is a schematic representation of components of an email communications system for an organization.

FIG. 1 schematically represents an architecture of a typical organization's email communications system. A mail server workstation 110 connects to a local area network 120, to which a number of local machines 130 are connected. The mail server workstation 110 operates mail server software and the local machines 130 operate email client software. The mail server workstation 110 connects to a wide-area network 140 that in turn connects to a number of remote machines 150. The configuration depicted in FIG. 1 permits communications between those operating local machines 130, and also with those operating remote machines 150.

Figure 2:
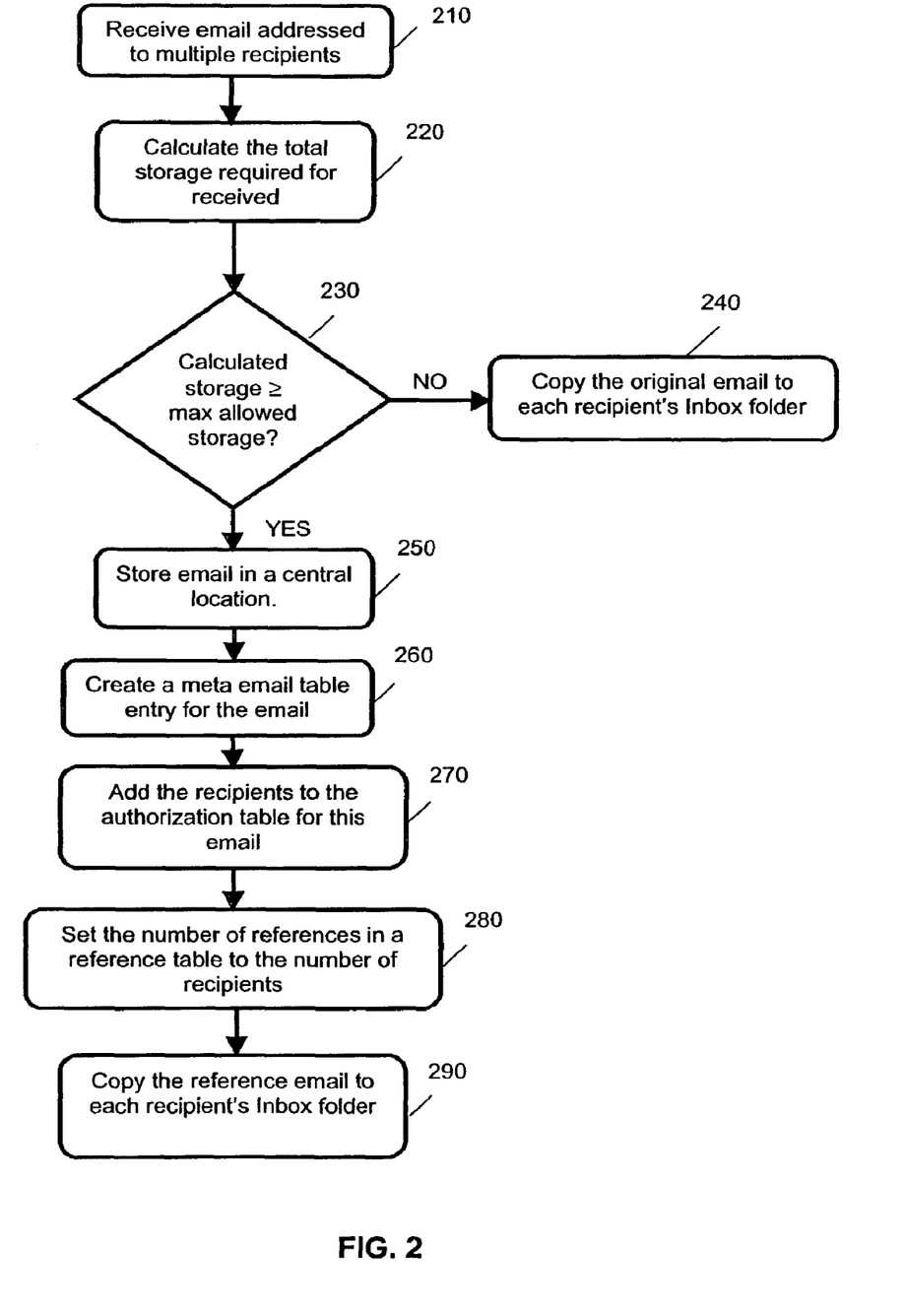
FIG. 2 is a flowchart of steps involved in processing incoming email messages received at a mail server.

FIG. 2 represents steps involved in receiving an email that is addressed to multiple recipients in an email system such as that shown in FIG. 1. Each of the numbered steps depicted in FIG. 2 is described below.

| | |
|---|---|
| Step 210 | The mail server 110 receives an email message addressed to multiple recipients 130, 150. |
| Step 220 | The mail server 110 determines the size of the email message (including any attachments) and the number of the recipients 130, 150 who have their mailbox on the same mail server. The size of the email message includes the size of the body of the email message, and the size of any attachments. |
| Decision 230 | The mail server 110 compares the total storage required with a predetermined value. If the storage required is greater than or equal to the predetermined value, then processing continues with step 250. If the storage required is less than the predetermined value, then processing continues with step 240. |
| Step 240 | The mail server 110 copies the incoming mail to the "Inbox" of every recepient, like normal mail. |
| Step 250 | If the storage required is greater than the predetermined value, then the mail server 110 keeps a single shared copy of the email message on the mail server 110 and copies a reference email message to the "Inbox" of all recipients of the email message. A count of number of references is maintained on the mail server 110. |
| Step 260 | The mail server 110 creates an entry for this email message. |
| Step 270 | The mail server 110 adds the recepient of this email message. Only after this entry is made, the recipient can access the email message stored in the central storage. |
| Step 280 | The number of references are maintained in a reference table. This recorded number references is the same as the number of recipients of the original email message. If the recipient deletes the reference email message from the recipient's "Inbox" folder, the reference count associated with the email message is consequently decreased by one. The shared email message is deleted if the reference count becomes zero. |
| Step 290 | The mail server copies the reference email message to the "Inbox" of the individual recipients. The reference email message is similar to a "doclink". This doclink is triggered automatically when the recipient opens the reference email message. The reference email messge is "transparent" to the recipient, as the reference email message links directly to the shared email message. The recipient views only the contents (and any attachments) of the shared email message. All the reference email messages refer to the single shared email message. If the recipient attempts to make any change to the shared email message, then a local copy of the email message is created in the recipient's mail database for editing. |

Mail Server Software

Figure 3:
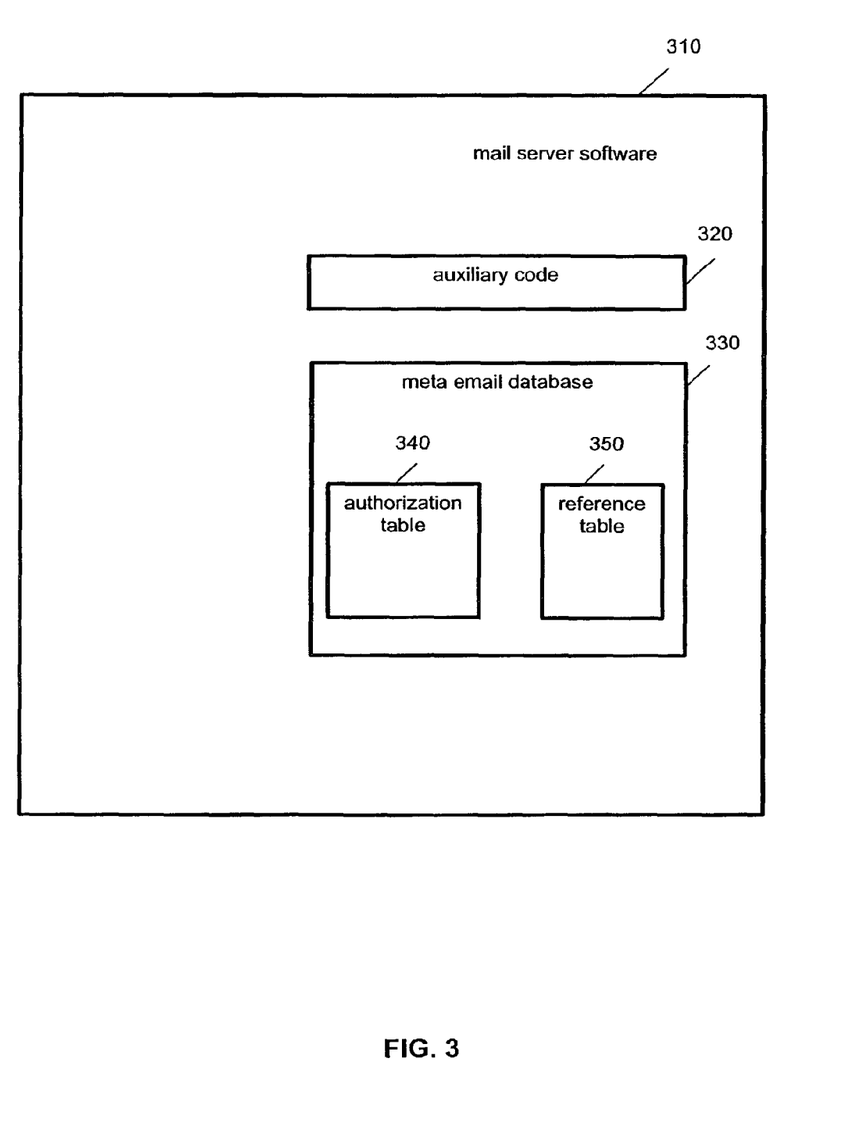
FIG. 3 is a flowchart of steps involved in administering a mail server in relation to email messages that are distributed as described with reference to FIG. 2.

FIG. 3 is a schematic representation of the mail server software 310 operating on the mail server depicted in FIG. 1. The mail server software 310 includes auxiliary code 320, beside that which is required for regular operation of the mail server, for performing the procedures described herein with reference to FIGS. 2 and 3.

The mail server software 310 also maintains a meta email database 330 which contains an authorization table 340 and a reference table 350. The authorization table 340 contains information about which recipients are allowed to view which shared email messages. The reference table 350 is also used for recording the existing number of references to particular shared email messages.

The reference table 350 comprises a simple counter. The authorization table 340 lists recipients who are authorized to view the original incoming email message. Each record has two fields: (i) a unique identification number identifying the incoming email message, and the email address of the authorized to view the shared message. The entry for each recipient is removed from the authorization table 340 as that recipient deletes their respective reference message from their "Inbox" folder. A simple example of an authorization table 340 is given in Table 1.

TABLE 1

| Unique message id | Authorized recipient |
|---|---|
| 123456789 | jamit@in.ibm.com |
| 123456789 | cutkarsh@in.ibm.com |

Mail Server Administration

Figure 4:
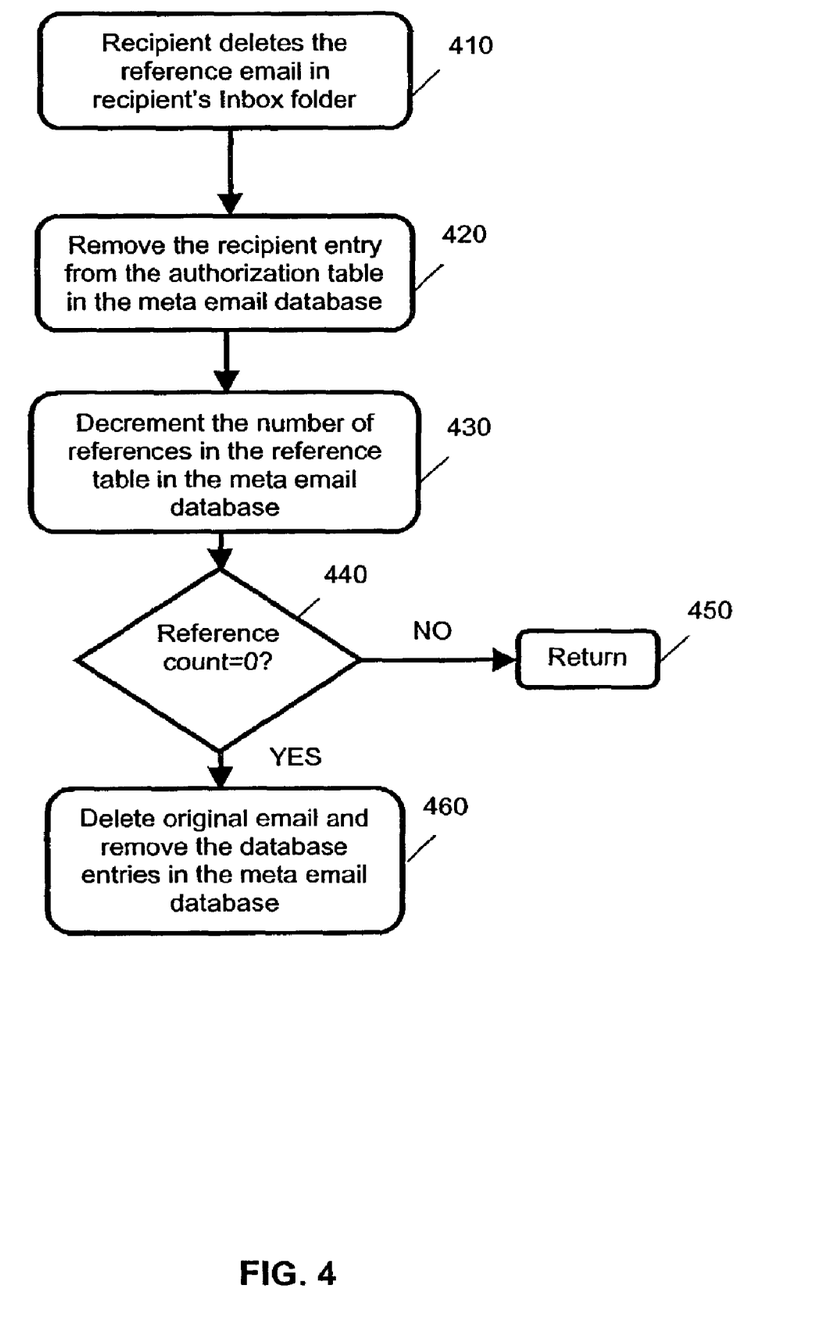
FIG. 4 is a schematic representation of the components of the mail server software used to perform the techniques described with reference to FIGS. 2 and 3.

FIG. 4 represents steps involved in administering a mail server described with reference to FIG. 3 when distributing email messages in the manner described with reference to FIG. 2.

| | |
|---|---|
| Step 410 | The recipient deletes the reference email message in the recipient's Inbox folder. |
| Step 420 | The recipient entry is removed from an authorization table in meta email database. |
| Step 430 | The number of references in the reference table is decremented in the meta email database. |
| Decision 440 | The number of references is checked. If the number of references is zero, processing continues with step 460. If the number of references is not zero, then processing returns to step 450. |
| Step 450 | If the number of references is not zero, regular processing returns. For example, a determination is made whether step 410 occurs, in which case step 420 is initiated. |

| Step 460 | The shared email message is deleted and the database entries in the meta email database are removed. |

Figure 5:
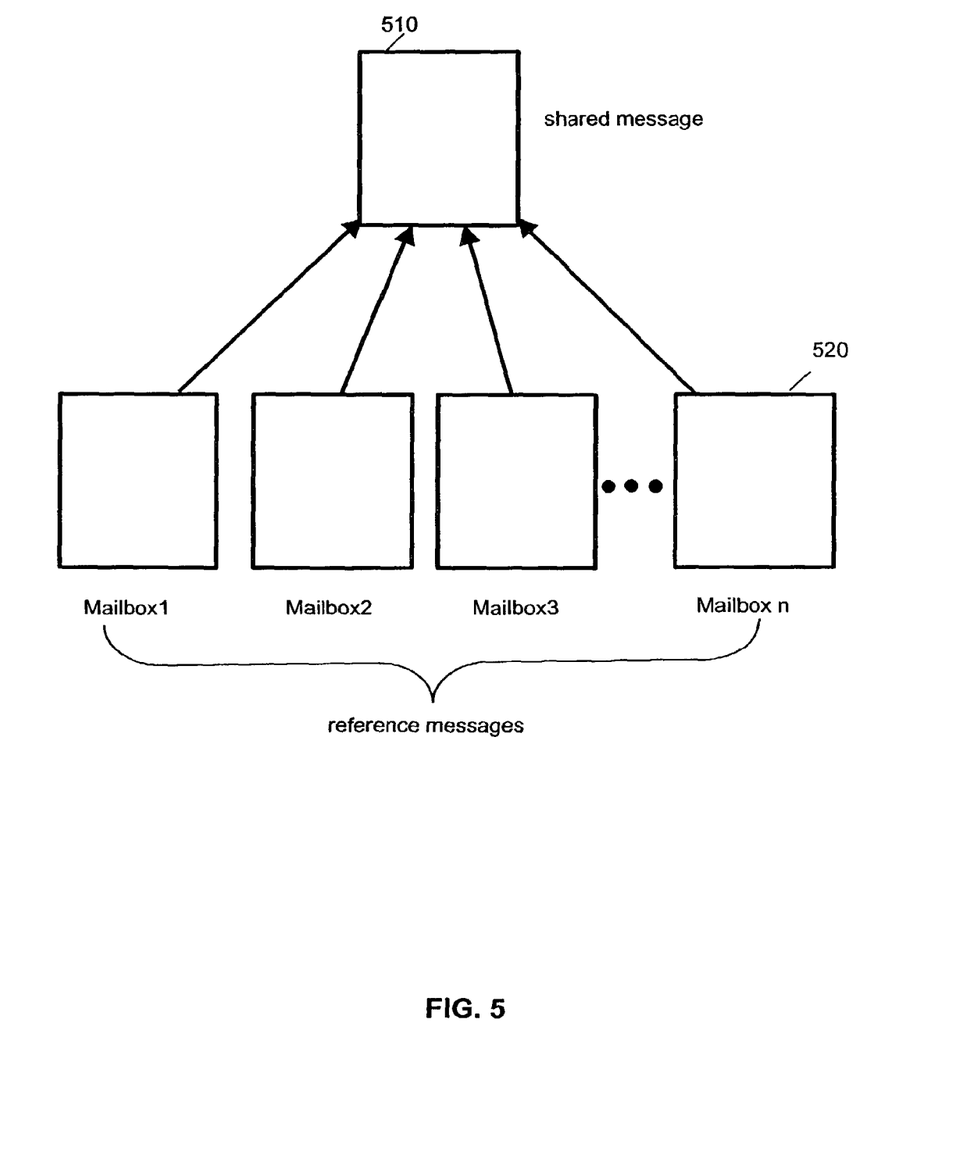
FIG. 5 is a schematic representation of the relationship between a shared email message and reference email messages when an incoming email messages is processinged in accordance with FIG. 2.

FIG. 5 schematically depicts the relationship between a shared email message 510 and reference email messages 520 that are distributed by the mail server software to respective recipients.

Overview

The procedure described with reference to FIGS. 2 and 3 is now outlined with reference to the components of the mail server software described with reference to FIG. 4.

The mail server has some common storage space set aside for email messages that are referenced in the manner according to the techniques described herein. The mail server is configured with a parameter that specifies the minimum size of mails that are stored in the common storage area.

Upon receiving a new email message, the mail server checks if the new email message is addressed to multiple recipients. If so, then the mail server checks for the number of recipients on this mail server. The number of recipients on this mail server is data that is used to calculate the total storage space required on the mail server. If the total storage space required is lesser than a predetermined (and configurable) threshold value, then the email messages are copied to the Inbox folder of each recipient.

If the required storage space is greater than the predetermined threshold value, then the mail server copies the email message to a common storage space. After copying the email message to the shared storage area, the server copies a reference message to the Inbox folder of each recipient. The mail server also populates the meta email tables with the number of references and the authorization information.

When the email client requests the mail server to open the reference email message, the server opens the shared email message, instead. If the recipient deletes the email message from their Inbox folder, the mail server: (i) deletes the reference email message, (ii) decreases the count of references in the shared mail information table, and (iii) removes this recipient from the authorization table of the shared email message. At this time, if the reference count becomes zero, the shared email message and the corresponding records in the meta mail database are deleted.

Reduction of Data Storage Requirements

Assuming that 0.1 MB of disk space is required to create the reference email message in the recipient's mailbox, disk capacity that is freed for other uses can be calculated in the manner described below in Table 2.

TABLE 2

Total data storage for 1 copy of email message =
1.1 MB = A
Total data capacity for 100 copies of email message =
A * 100 = 1.1 * 100 = 110 MB = B
Total data capacity for reference email message =
0.1 × 100 = 10 MB = C
Total data capacity for shared mail = A = 1.1 MB = D
Comparative saving of data capacity using described technique =
B − (C + D) = 110 − (10 + 1.1) = 98.9 MB POP Mail Servers For email clients that use POP (Post Office Protocol) to access the email messages, the server maintains a count of the "popped" email messages. When a POP mail server receives an email message addressed to multiple recipients on the same mail server, the POP mail server copies the email message to a common storage area, and copies a reference email message in the recipient's mailbox. When the client requests to "pop" a referenced mail, the POP mail server "pops" the shared email message in the common storage area, and decreases the number of references in the meta mail table accordingly.

Computer Hardware and Software

Figure 6:
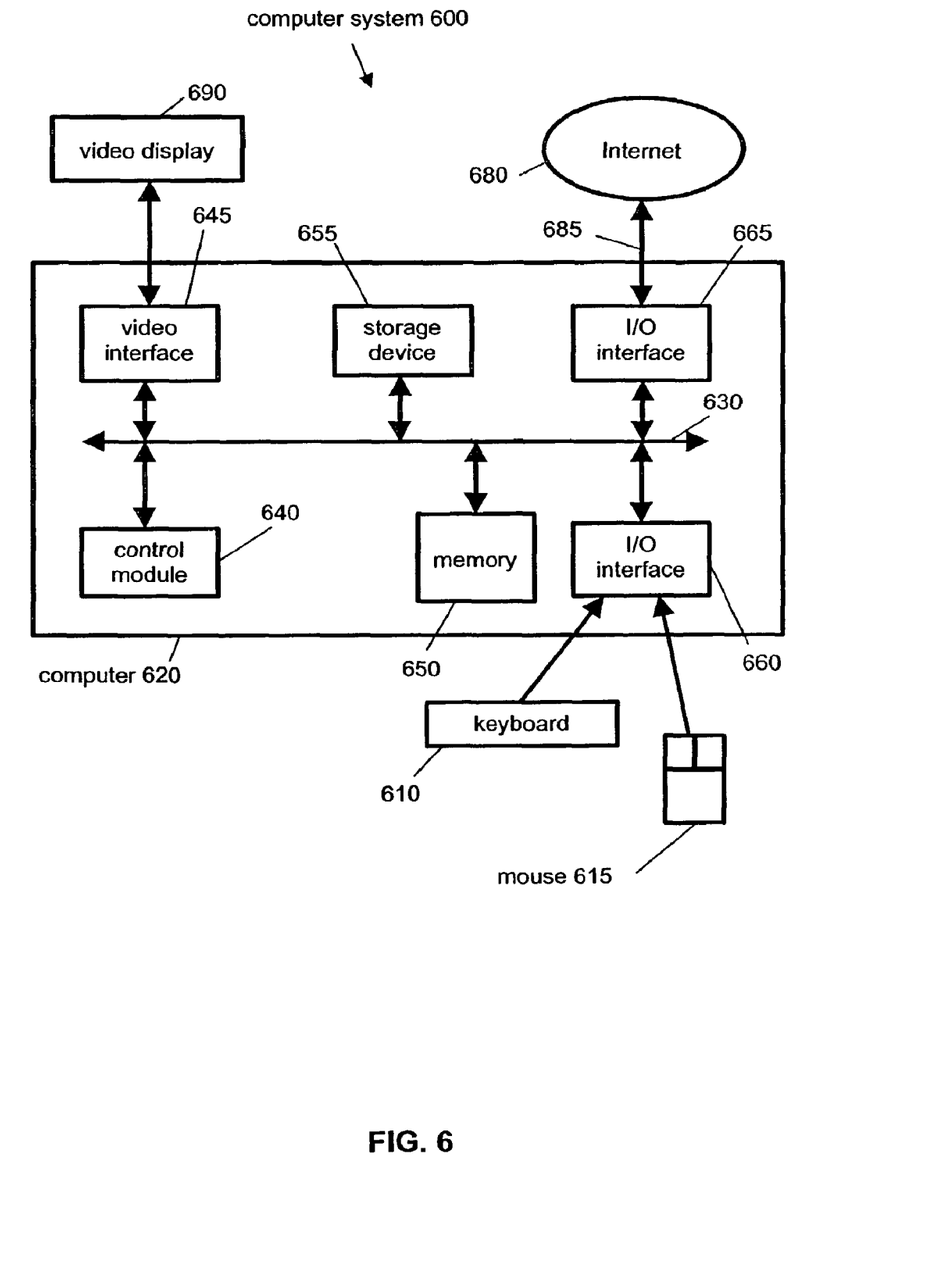
FIG. 6 is a schematic representation of a computer system suitable for performing the techniques described with reference to FIGS. 2 and 3.

FIG. 6 is a schematic representation of a computer system 600, of the type provided as the mail server, and local and remote machines of FIG. 1. The computer system 600 described herein is of a type that, as described above, can be used to perform steps that implement the techniques described herein. The computer system 600 executes computer software under a suitable operating system installed on the computer system 600.

The computer software involves a set of programmed logic instructions that are able to be interpreted by the computer system 600 for instructing the computer system 600 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 600 include: a computer 620, input devices 610, 615 and video display 690. The computer 620 includes: processor 640, memory module 650, input/output (I/O) interfaces 660, 665, video interface 645, and storage device 655.

The processor 640 is a central processing unit (CPU) that executes the operating system and the computer software executing under the operating system. The memory module 650 includes random access memory (RAM) and read-only memory (ROM), and is used under direction of the processor 640.

The video interface 645 is connected to video display 690 and provides video signals for display on the video display 690. Recipient input to operate the computer 630 is provided from input devices 610, 615 consisting of keyboard 610 and mouse 615. The storage device 655 can include a disk drive or any other suitable non-volatile storage medium.

Each of the components of the computer 620 is connected to a bus 630 that includes data, address, and control buses, to allow these components to communicate with each other via the bus 630.

The computer system 600 can be connected to one or more other similar computers via a input/output (I/O) interface 665 using a communication channel 685 to a network 680, represented as the Internet.

The computer software program may be provided as a computer program product, and recorded on a portable storage medium. In this case, the computer software program is accessed by the computer system 600 from the storage device 655. Alternatively, the computer software can be accessed directly from the network 680 by the computer 620. In either case, a recipient can interact with the computer system 600 using the keyboard 610 and mouse 615 to operate the programmed computer software executing on the computer 620.

The computer system 600 is described for illustrative purposes: other configurations or types of computer systems can be equally well used to implement the described techniques. The foregoing is only an example of a particular type of computer system suitable for implementing the described techniques.

CONCLUSION

A method, a computer system and computer software are described herein in the context of a redesigned mail server able to reduce its data storage requirements.

The techniques described herein can be used to achieve various advantages, including:
reduced consumption of data storage capacity on mail server.
cost savings that result from reduced consumption of data storage capacity.
reduced size of each recipient's "Inbox".

The techniques and arrangements described herein are described in the context of existing electronic mail or email infrastructure. However, the described techniques and arrangements can be adapted other forms of electronic messaging. Further, while an example of an implementation is described with reference to POP messaging systems, modified implementations are possible for other email protocols.

Various alterations and modifications can be made to the techniques and arrangements described herein, as would be apparent to one skilled in the relevant art.

We claim:

1. A method for reducing data storage requirements of a mail server, the method comprising:
  determining, for an incoming email message having a certain size, a size of the incoming email message, wherein the incoming email message is addressed to multiple recipients;
  determining a selected recipient count for recipients of the incoming email message, the selected recipient count indicating how many of the recipients have mailboxes on the mail server;
  calculating a total amount of storage for storing copies of the incoming email message in each one of the recipient's mailboxes on the mail server, the calculating being a function of the size of the incoming email message and the selected recipient count;
  comparing the calculated total amount of storage to a predetermined limit; and
  selecting between i) storing copies of the incoming email message in mailboxes of the multiple recipients, such that multiple copies of the incoming email message are stored on the mail server in the mailboxes of the multiple recipients, and ii) storing for the mailboxes of the multiple recipients, and sharing among the mailboxes of the multiple recipients, only a single copy of the incoming email message on the mail server as a shared incoming email message for the mailboxes of the multiple recipients, wherein the selecting is responsive to the comparing.

2. The method of claim 1, wherein the determining of the size of the incoming email message is responsive to the incoming email message being addressed to multiple recipients.

3. The method of claim 2, wherein the determining of the size of the incoming email message is responsive to the multiple recipients having mailboxes on the mail server.

4. The method of claim 1, comprising:
  storing a list of recipients authorized to view the incoming email message, wherein the storing of the list is responsive to selecting to store only a single copy of the incoming email message on the mail server as a shared incoming email message for the mailboxes of the multiple recipients.

5. The method of claim 1, comprising:
  storing an identifier for the single copy of the incoming email message.

6. The method of claim 4, comprising:
  storing an identifier for the single copy of the incoming email message, wherein the stored identifier is associated with the stored list of recipients.

7. A computer program product, stored on a computer storage medium, for reducing data storage requirements of a mail server, the computer program product having instructions for execution by a computer, wherein the instructions, when executed by the computer, cause the computer to implement a method comprising:
  determining, for an incoming email message having a certain size, the size of the incoming email message, wherein the incoming email message is addressed to multiple recipients;
  determining a selected recipient count for recipients of the incoming email message, the selected recipient count indicating how many of the recipients have mailboxes on the mail server;
  calculating a total amount of storage for storing copies of the incoming email message in each one of the recipient's mailboxes on the mail server, the calculating being a function of the size of the incoming email message and the selected recipient count;
  comparing the calculated total amount of storage to a predetermined limit; and
  selecting between i) storing copies of the incoming email message in mailboxes of the multiple recipients, such that multiple copies of the incoming email message are stored on the mail server in the mailboxes of the multiple recipients, and ii) storing for the mailboxes of the multiple recipients, and sharing among the mailboxes of the multiple recipients, only a single copy of the incoming email message on the mail server as a shared incoming email message for the mailboxes of the multiple recipients, wherein the selecting is responsive to the comparing.

8. The computer program product of claim 7, wherein the determining of the size of the incoming email message is responsive to the incoming email message being addressed to multiple recipients.

9. The computer program product of claim 8, wherein the determining of the size of the incoming email message is responsive to the multiple recipients having mailboxes on the mail server.

10. The computer program product of claim 7, wherein the method implemented by the computer executing the instructions of the computer program product comprises:
  storing a list of recipients authorized to view the incoming email message, wherein the storing of the list is responsive to selecting to store only a single copy of the incoming email message on the mail server as a shared incoming email message for the mailboxes of the multiple recipients.

11. The computer program product of claim 7, wherein the method implemented by the computer executing the instructions of the computer program product comprises:
storing an identifier for the single copy of the incoming email message.

12. The computer program product of claim 10, wherein the method implemented by the computer executing the instructions of the computer program product comprises:
storing an identifier for the single copy of the incoming email message, wherein the stored identifier is associated with the stored list of recipients.

13. A computer system comprising:
a processor; and
a storage device connected to the processor, wherein the storage device has stored thereon data storage reducing program for controlling the processor, and wherein the processor is operative to execute instructions of the program to implement a method comprising:
determining, for an incoming email message having a certain size, the size of the incoming email message, wherein the incoming email message is addressed to multiple recipients;
determining a selected recipient count for recipients of the incoming email message, the selected recipient count indicating how many of the recipients have mailboxes on the mail server;
calculating a total amount of storage for storing copies of the incoming email message in each one of the recipient's mailboxes on the mail server, the calculating being a function of the size of the incoming email message and the selected recipient count;
comparing the calculated total amount of storage to a predetermined limit; and
selecting between i) storing copies of the incoming email message in mailboxes of the multiple recipients, such that multiple copies of the incoming email message are stored on the mail server in the mailboxes of the multiple recipients, and ii) storing for the mailboxes of the multiple recipients, and sharing among the mailboxes of the multiple recipients, only a single copy of the incoming message on the mail server as a shared incoming email message for the mailboxes of the multiple recipients, wherein the selecting is responsive to the comparing.

14. The computer system of claim 13, wherein the determining of the size of the incoming email message is responsive to the incoming email message being addressed to multiple recipients.

15. The computer program product of claim 14, wherein the determining of the size of the incoming email message is responsive to the multiple recipients having mailboxes on the mail server.

16. The computer system of claim 13, wherein the method implemented by the computer executing the instructions of the computer program product comprises:
storing a list of recipients authorized to view the incoming email message, wherein the storing of the list is responsive to selecting to store only a single copy of the incoming email message on the mail server as a shared incoming email message for the mailboxes of the multiple recipients.

17. The computer system of claim 13, wherein the method implemented by the computer executing the instructions of the computer program product comprises:
storing an identifier for the single copy of the incoming email message.

18. The computer system of claim 16, wherein the method implemented by the computer executing the instructions of the computer program product comprises:
storing an identifier for the single copy of the incoming message, wherein the stored identifier is associated with the stored list of recipients.

* * * * *